United States Patent [19]
Ohashi

[11] Patent Number: 5,157,990
[45] Date of Patent: Oct. 27, 1992

[54] CONTROL SYSTEM AND METHOD FOR AUTOMOTIVE AUTOMATIC POWER TRANSMISSION

[75] Inventor: Tetsuji Ohashi, Shizuoka, Japan

[73] Assignee: JATCO Corporation, Japan

[21] Appl. No.: 775,851

[22] Filed: Oct. 15, 1991

[30] Foreign Application Priority Data

Oct. 17, 1990 [JP] Japan ................. 2-278444

[51] Int. Cl.⁵ .................. B60K 41/12; B60K 41/04
[52] U.S. Cl. ...................... 74/866; 180/170; 180/179; 364/424.1
[58] Field of Search ............ 74/866; 180/179, 170; 364/424.1

[56] References Cited

U.S. PATENT DOCUMENTS

| 4,665,773 | 5/1987 | Hiramatsu et al. ......... | 74/866 X |
| 4,922,425 | 5/1990 | Mack et al. ............... | 74/866 X |
| 4,924,397 | 5/1990 | Kurihara et al. ........... | 180/179 X |

FOREIGN PATENT DOCUMENTS 63-308256 12/1988 Japan .

Primary Examiner—Rodney H. Bonck
Assistant Examiner—Daniel Wittels
Attorney, Agent, or Firm—Ronald P. Kananen

[57] ABSTRACT

A system and method for controlling a vehicular power transmission in which, when a signal derived from a vehicle speed sensor is normal, a signal supplied to a first input terminal of the control unit is determined to be the signal of a switch used for an automatic cruise speed control device (ASCD) only when the signal derived from the vehicle speed signal satisfies a predetermined condition, e.g., when the vehicle speed is below a predetermined value. When the signal derived from the vehicle speed sensor does not satisfy the predetermined condition, e.g., when the vehicle speed is above the predetermined value, or when the vehicle speed sensor is abnormal, the signal input to the first supplied terminal of the control unit is determined to be the signal of a switch used for a self diagnostic function. Therefore, if the vehicle speed sensor operates abnormally, the control unit determines that the signal supplied to the first input terminal is derived from the switch used for the self-diagnostic function. Hence, it is possible to operate at least the self diagnostic function even when the vehicle speed sensor malfunctions.

10 Claims, 2 Drawing Sheets

CONTROL SYSTEM AND METHOD FOR AUTOMOTIVE AUTOMATIC POWER TRANSMISSION

BACKGROUND OF THE INVENTION

1. Field of the Invention

The present invention relates to a control system and method applicable to an automotive automatic power transmission.

2. Description of the background art

A Japanese Patent Application First Publication No. Showa 63-308256 published on Dec. 15, 1988 exemplifies a control system applicable to an automotive automatic power transmission.

In the disclosed control system, signals derived from two switches are supplied to one input terminal of a control unit according to a difference in input signal timings. Specifically, two signals, a test switch signal for self-diagnosis of a computer and a switch signal for an automatic cruise speed control system are supplied to the same input terminal. In this way, as compared with the case where two input terminals are installed respectively for each switch, the number of input terminals are decreased and the wiring can be simplified. However, according to the above described system, when the vehicle speed is below a predetermined value and either signal is supplied to this input terminal, the system determines that the signal is derived from the switch for the automatic cruise speed control device.

This creates a drawback for the functioning of the control system in that self diagnosis of the control unit cannot be made if a sensor, such as that detecting a vehicle speed, fails. In other words, if the vehicle speed sensor fails, or both vehicle speed sensors, a back-up vehicle speed sensor is activated when the first vehicle speed sensor fails, the system determines that a vehicle speed change has occured and reads the failed sensor as indicating a vehicle speed of zero, consequently, an abrupt shift down occurs.

To prevent such a phenomenon as described above, the above described control system holds the vehicle speed signal at a time when the vehicle speed sensor has failed or provides for a predetermined vehicle speed signal to be substituted.

When the vehicle speed sensor has failed and the output vehicle speed signal is higher than a vehicle speed level, which serves as a threshold for distinguishing between the signals derived from the two switches, the disclosed system determines that the signal is derived from the automatic cruise speed control device. Hence, under such a situation, even if the test switch is operated, the disclosed system determines that the signal is derived from the automatic cruise speed control device. Consequently, the self diagnosis function cannot be activated in such a condition. In addition, since the vehicle speed sensor has failed, the automatic cruise speed control device cannot function normally even if the signal derived from the automatic cruise speed control device is supplied as an input.

As described above when the vehicle speed sensor has failed and the signal derived from the test switch is not effectively supplied to the control unit, self diagnosis of the control unit cannot be accomplished.

SUMMARY OF THE INVENTION

It is, therefore, an object of the present invention to provide an improved system and method for controlling an automotive automatic power transmission, in which a signal supplied to an input terminal of a control unit is determined to be a signal for a self diagnosis function when a vehicle speed sensor becomes abnormal.

The above-described object can be achieved by providing a control system comprising a control unit having a plurality of input terminals, a first input terminal receiving a signal derived from one or more switches, and a second input terminal receiving a signal derived from a predetermined sensor. The control unit determines that the signal supplied to the first input terminal is the signal to operate a self-diagnosis function of the control unit when the signal derived from the predetermined sensor falls in a predetermined condition. The control system determines whether the predetermined sensor operates normally. The control system also determines that the signal supplied to the first input terminal is the signal to operate the self diagnosis function irrespective of other conditions when the predetermined sensor operates abnormally.

The above-described object can also be achieved by providing a control system for a vehicular power transmission, comprising a control unit having a plurality of input terminals with, a first input terminal receiving a signal derived from at least one switch. The switch turns on either a self diagnosis of the control unit or a cruise speed control through control of the power transmission and a vehicular engine. A second input terminal receives a signal derived from a vehicle speed sensor. The control unit determines that the signal supplied to the first input terminal is a signal to turn on the self diagnosis when the signal from the vehicle speed sensor satisfies a predetermined condition. The control unit determines whether the vehicle speed sensor operates abnormally on the basis of the signal derived from the vehicle speed sensor and determines that the signal supplied to the first input terminal is the signal to turn on the self diagnosis irrespective of whether the signal derived from the vehicle speed sensor satisfies the predetermined condition when the vehicle speed sensor operates abnormally.

The above-described object can also be achieved by providing a method for controlling a vehicular power transmission, comprising the steps of determining whether a sensor connected to a first input terminal of a control unit of the vehicular power transmission operates normally on a basis of a signal derived from the sensor; determining that a signal supplied to a second input terminal of the control unit is from a switch to turn on a self diagnostic function of the control unit when the sensor operates normally even though the signal supplied to the second input terminal of the control unit is determined to be from a switch to turn on another function of the control unit.

DETAILED DESCRIPTION OF THE PREFERRED EMBODIMENT

Reference will hereinafter be made to the drawings in order to facilitate a better understanding of the present invention.

Figure 1:
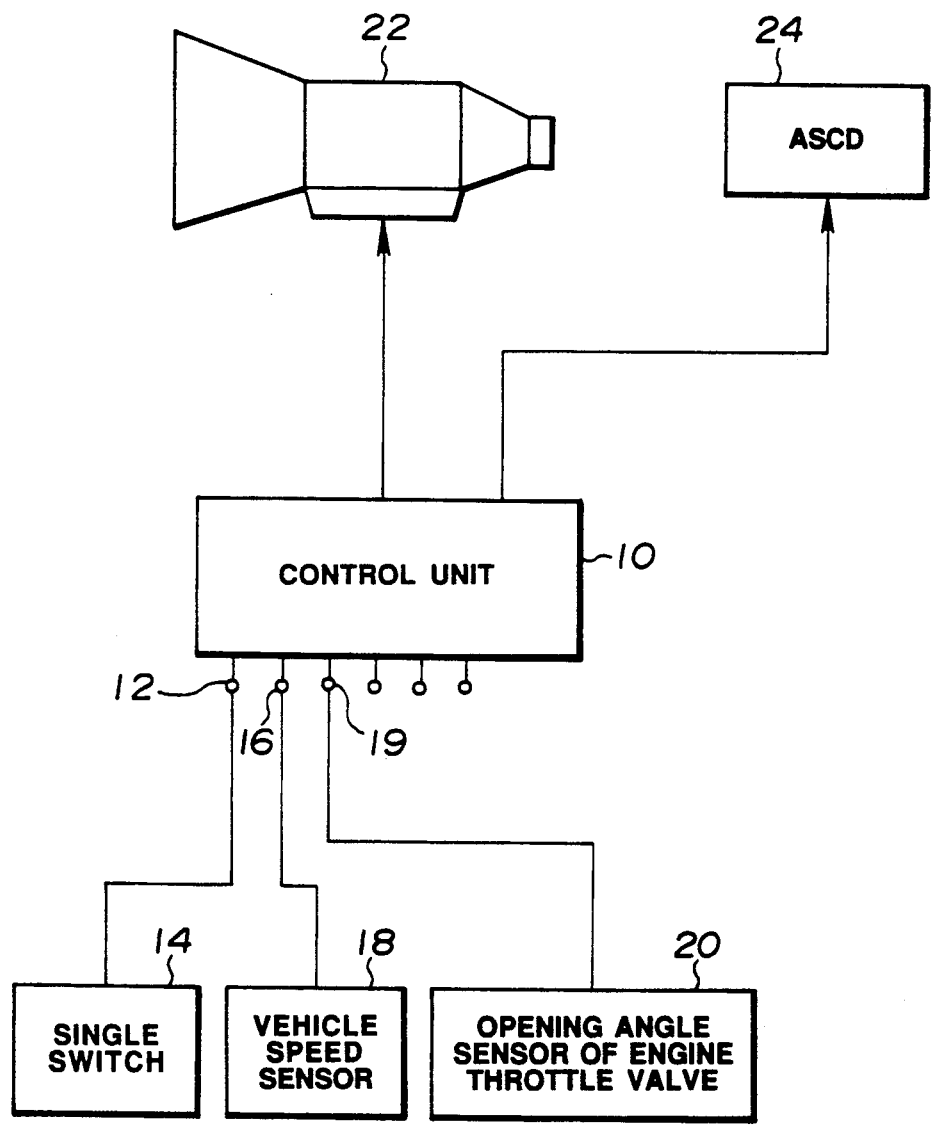
FIG. 1 is a simplified block diagram of a control system for an automotive automatic power transmission in a preferred embodiment according to the present invention.

FIG. 1 shows a circuit block diagram of a vehicular automatic power transmission controlling system in a preferred embodiment according to the present invention.

A control unit 10 is constituted by a microcomputer having a CPU, ROM, RAM, I/O unit, and common bus. The control unit 10 is provided with a plurality of input terminals, with a first input terminal 12 receiving a signal from a single switch 14. The function of the single switch 14 will be described later. A second input terminal 16 receives a signal from a vehicle speed sensor 18. A third input terminal 19 receives a signal from a throttle valve opening angle sensor 20. Input terminals other than the above-described first through third input terminals may be present, receiving signals derived from various types of switches and sensors.

The single switch 14 serves both for an automatic cruise speed control device (ASCD) and for a self-diagnosis switch. It is noted that separate switches for the ASCD and self-diagnosis may alternatively be installed in place of the single switch 14.

The vehicle speed sensor 18 detects a vehicle speed and the throttle valve opening angle sensor 20 detects an opening angle of an engine throttle valve. The control unit 10 outputs signals related to a gear shift control and to hydraulic control of an automatic power transmission 22 as well as signals to control the ASCD 24 on the basis of various signals supplied thereto.

It is noted that the structure of the ASCD is exemplified by U.S. Pat. No. 5,051,905 issued on Sep. 24, 1991, the disclosure of which is herein incorporated by reference.

Figure 2:
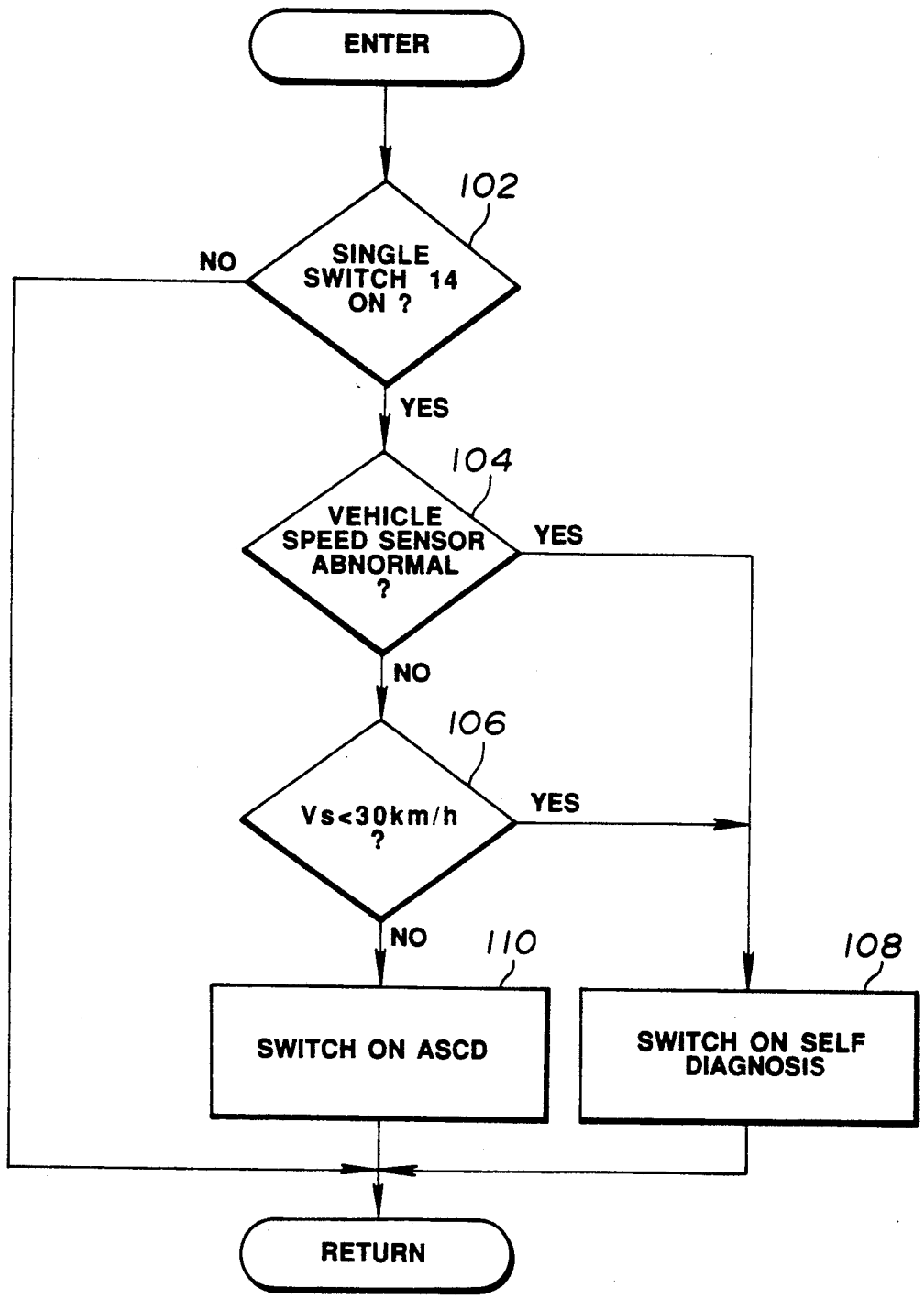
FIG. 2 is an operational flowchart of a control unit for the control system of FIG. 1.

The control unit 10 processes data according to the operational flow chart shown in FIG. 2, in accordance with the signal derived from the single switch 14.

First, in a step 102, the CPU of the control unit 10 determines whether the single switch 14 is turned on.

If the single switch 18 is turned on, the CPU determines whether the vehicle speed sensor 18 operates abnormally in a step 104.

The vehicle speed sensor 14 is determined to operate abnormally, irrespective of the vehicle running condition, when its output signal inidicates that the vehicle speed is out of a set range. When a plurality of vehicle speed sensors 18 are installed, the CPU determines that the vehicle speed sensor 18 is abnormal only when all of the vehicle speed sensors 18 are not operating normally.

If the vehicle speed sensor 18 is determined to be abnormal, the control unit 10 determines that the signal for self-diagnosis is turned on in a step 108. Therefore, self diagnosis processing becomes possible.

When the vehicle speed sensor 18 is determined to be normal at step 104, the CPU determines whether the vehicle speed is below 30 Km/h in a step 106. If the vehicle speed is below 30 Km/h, the CPU determines that the switch for self diagnosis is turned on in the same manner as when the vehicle speed sensor operates abnormally. When the vehicle speed is above 30 Km/h, the control unit 10 determines that the switch for the ASCD is turned on so that control of the ASCD 24 may be is performed normally at step 110.

Consequently, when the vehicle speed sensor 18 is abnormal and the signal from the single switch 14 is an input, the self-diagnostic function is performed.

Hence, even when the vehicle speed sensor 18 becomes abnormal, the two functions of the single switch 14 are not ineffective so that the switch for at least the self diagnostic function may be operable.

As described hereinabove, according to the present invention, when a predetermined sensor is in an abnormal condition, the signal supplied to a predetermined input terminal is determined to be the signal for self diagnosis. Thus, self diagnosis may be executed even when the predetermined sensor is determined to abnormal.

It will fully be appreciated by those skilled in the art that the foregoing description is made in terms of the preferred embodiment and various changes and modifications may be made without departing from the scope of the present invention as defined by the appended claims.

What is claimed is:

1. A control system comprising:
   a) a control unit having a plurality of input terminals, a first input terminal receiving a first signal derived from one or more switches, a second input terminal receiving a sensed signal drived from a sensor, the control unit determining that said first signal supplied to the first input terminal is self-diagnosis signal for starting a self-diagnosis function of the control unit when said sensed signal derived from the sensor falls in a first predetermined condition;
   b) first means for determining whether the sensor is operating normally; and
   c) second means for determining that said first signal supplied to the first input terminal is said self-diagnosis signal to operate the self-diagnosis function irrespective of whether the sensed signal derived from said sensor falls in a second predetermined condition when the first means determines that the sensor is operating abnormally.

2. A control system as set forth in claim 1, wherein the control unit controls a vehicular automatic power transmission, and wherein a speed control signal for operating an automatic cruise speed control device is supplied to the first input terminal in addition to the self-diagnosis signal to operate the self-diagnosis function, and wherein said first sensor comprises a vehicle speed sensor for a detecting a vehicle speed, said first predetermined condition being set such that the first signal supplied to the first input terminal operates the self-diagnosis function when the vehicle speed is below a predetermined value and the first signal supplied to the first terminal operates the automatic cruise speed control device when the vehicle speed is above the predetermined value.

3. A control system for a vehicular power transmission, comprising:
   a) a control unit having a plurality of input terminals, a first input terminal receiving a first signal from at least one switch, the switch turning on either a self-diagnosis function of the control unit or a cruise speed control device through the power transmission and a vehicular engine, and a second input terminal receiving a sensed signal derived from a vehicle speed sensor, the control unit determining that the first signal supplied to the first input terminal is a self-diagnosis signal to turn on the self-diagnosis function when the sensed signal derived from the vehicle speed sensor satisfies a predetermined condition;

b) first means installed in the conctrol unit for determining whether the vehicle speed sensor is operating abnormally on the basis of the sensed signal derived from said vehicle speed sensor; and c) second means installed in the control unit for determining that the signal supplied to the first input terminal is the self-diagnosis signal to turn on the self-diagnosis function irrespective of whether the sensed signal derived from said vehicle speed sensor satisfies the predetermined condition when the first means determines that the vehicle speed sensor is operating abnormally.

4. A control system as set forth in claim 3, wherein the switch comprises a single switch for turning on the automatic cruise speed control device and for turning on the self-diagnosis function of the control unit.

5. A control system as set forth in claim 3, wherein the predetermined condition is satisfied when the vehicle speed indicated by the vehicle speed sensor is below a predetermined value of speed.

6. A control system as set forth in claim 5, wherein said predetermined value of speed is 30 Km/h.

7. A method for controlling a vehicular power transmission, comprising the steps of:

(a) determining whether a sensor connected to a first input terminal of a control unit of the vehicular power transmission is operating normally on a basis of a sensed signal derived from said sensor;

(b) determining that a signal supplied to a second input terminal of the control unit is from a switch for turning on a self-diagnosis function of the cocntrol unit when the sensor is not operating normally even though the signal supplied to the second input terminal of the control unit is from a switch for turning on another function of the control unit.

8. A method as set forth in claim 7, further comprising the steps of:

comparing said sensed signal to a predetermined value when said sensor is operating normally; and determining that said signal supplied to said second input terminal is from said switch for turning on said self-diagnostic function when said sensed signal is below said predetermined value and determining that said signal supplied to said second input terminal is for turning on said another function when said sensed signal is not below said predetermined value.

9. A method as set forth in claim 7, wherein said sensor comprises a vehicle speed sensor and said another function comprises an automatic cruise speed control function.

10. A control system for a vehicular power transmission, comprising:

a) a control unit having a plurality of input terminals for receiving signals from manually operable switches and from sensors for the power transmission, a first input terminal receiving a first signal from one of at least two switches, wherein said one switch is for starting a self-diagnosis function of the control unit, a second input terminal receiving a sensed signal from a first sensor, the control unit determining that said first signal supplied to said first input terminal is a self-diagnosis signal from said one switch for starting said self-diagnosis function of the control unit when the sensed signal from the first sensor falls in a first predetermined condition;

b) first means, installed in the control unit, for determining whether said first sensor has failed according to said sensed signal at the second input terminal; and c) means for determining that the first signal supplied to the first input terminal is the self-diagnosis signal for starting the self-diagnosis function when said first means determines that the first sensor fails irrespective of whether the sensed signal from said first sensor falls in a second predetermined condition.

* * * * *